US007177810B2

(12) United States Patent
Shriberg et al.

(10) Patent No.: US 7,177,810 B2
(45) Date of Patent: Feb. 13, 2007

(54) METHOD AND APPARATUS FOR PERFORMING PROSODY-BASED ENDPOINTING OF A SPEECH SIGNAL

(75) Inventors: Elizabeth Shriberg, Berkeley, CA (US); Harry Bratt, Mountain View, CA (US); Mustafa K. Sonmez, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 677 days.

(21) Appl. No.: 09/829,831

(22) Filed: Apr. 10, 2001

(65) Prior Publication Data

US 2002/0147581 A1 Oct. 10, 2002

(51) Int. Cl.
*G10L 15/04* (2006.01)
*G10L 11/04* (2006.01)
*G10L 11/06* (2006.01)

(52) U.S. Cl. ...................... 704/253; 704/207; 704/210; 704/215

(58) Field of Classification Search ................ 704/246, 704/248, 253, 270, 206, 207, 210, 215
See application file for complete search history.

(56) References Cited

U.S. PATENT DOCUMENTS

| | | | | |
|---|---|---|---|---|
| 4,799,261 | A * | 1/1989 | Lin et al. | 704/219 |
| 4,881,266 | A * | 11/1989 | Nitta et al. | 704/253 |
| 5,199,077 | A * | 3/1993 | Wilcox et al. | 704/256 |
| 5,617,507 | A * | 4/1997 | Lee et al. | 704/200 |
| 5,890,117 | A * | 3/1999 | Silverman | 704/260 |
| 5,933,805 | A * | 8/1999 | Boss et al. | 704/249 |
| 6,226,611 | B1 * | 5/2001 | Neumeyer et al. | 704/246 |
| 6,253,182 | B1 * | 6/2001 | Acero | 704/268 |
| 6,366,884 | B1 * | 4/2002 | Bellegarda et al. | 704/266 |
| 6,470,316 | B1 * | 10/2002 | Chihara | 704/267 |
| 6,496,799 | B1 * | 12/2002 | Pickering | 704/235 |
| 6,625,575 | B2 * | 9/2003 | Chihara | 704/260 |
| 6,873,953 | B1 * | 3/2005 | Lennig | 704/253 |
| 2001/0021906 | A1 * | 9/2001 | Chihara | 704/258 |
| 2002/0049593 | A1 * | 4/2002 | Shao | 704/251 |

OTHER PUBLICATIONS

Shin et al., "Speech/non-speech classification using multiple features for robust endpoint detection", Acoustics, Speech, and Signal Processing, 2000, ICASSP '00, Proceedings, Jun. 5-9, 2000, pp: 1399-1402 vol. 3.*

(Continued)

*Primary Examiner*—David Hudspeth
*Assistant Examiner*—Brian Albertalli
(74) *Attorney, Agent, or Firm*—Kin-Wah Tong, Esq.; Patterson & Sheridan, LLP

(57) ABSTRACT

A method and apparatus for finding endpoints in speech by utilizing information contained in speech prosody. Prosody denotes the way speakers modulate the timing, pitch and loudness of phones, words, and phrases to convey certain aspects of meaning; informally, prosody includes what is perceived as the "rhythm" and "melody" of speech. Because speakers use prosody to convey units of speech to listeners, the method and apparatus performs endpoint detection by extracting and interpreting the relevant prosodic properties of speech.

24 Claims, 3 Drawing Sheets

200

OTHER PUBLICATIONS

Takagi et al., "Segmentation of spoken dialogue by interjections, disfluent utterances and pauses", Spoken Language, 1996. ICSLP 96. Proceedings., vol.: 2, Oct. 3-6, 1996, pp: 697-700.*
Essa, "Using Prosody in Automatic Segmentation of Speech", ACM Southeast Regional Conference, Proceedings of the 36th annual Southeast regional conference, 1998, pp: 44-49.*
Shriberg, et al, "Prosody-based automatic segmentation of speech into sentences and topics," Speech Communication 32, (2000), 127-154.
Sönmez, et al., "Modeling Dynamic Prosodic Variation for Speaker Verification," Proc. Intol. Conf. On Spoken Language Processing, 7, (1998) 3189-3192.

* cited by examiner

METHOD AND APPARATUS FOR PERFORMING PROSODY-BASED ENDPOINTING OF A SPEECH SIGNAL

"This invention was made with Government support under Grant No. IRI-9619921 awarded by the DARPA/National Science Foundation. The Government has certain rights to this invention".

BACKGROUND OF THE INVENTION

1. Field of the Invention

The present invention generally relates to speech processing techniques and, more particularly, the invention relates to a method and apparatus for performing prosody-based speech processing.

2. Description of the Related Art

Speech processing is used to produce signals for controlling devices or software programs, transcription of speech into written words, extraction of specific information from speech, classification of speech into document categories, archival and late retrieval of such information, and other related tasks. All such speech processing tasks are faced with the problem of locating within the speech signal suitable speech segments for processing. Segmenting the speech signal simplifies the signal processing required to identify words. Since spoken language is not usually produced with explicit indicators of such segments, segmentation within a speech processor may occur with respect to commands, sentences, paragraphs or topic units.

For example, a system that is controlled by voice commands needs to determine when a command uttered by a user is complete, i.e., when the system can stop waiting for further input and begin interpreting the command. The process used to determine whether a speaker has completed an utterance, e.g., a sentence or command, is known as endpointing. Generally, endpointing is performed by measuring the length of a pause in the speech signal. If the pause is sufficiently long, the endpointing process deems the utterance complete. However, endpointing processes that rely on pause duration are fraught with errors. For example, many times a speaker will pause in mid-sentence while thinking about what is to be said next. An endpointing process that is based upon pause sensing will identify such pauses as occurring at the end of a sentence, when that is not the case. Consequently, the speech recognition processing that is relying upon accurate endpointing will erroneously process the speech signal.

Therefore, there is a need in the art for a method and apparatus that accurately identifies an endpoint in a speech signal.

SUMMARY OF THE INVENTION

The present invention generally provides a method and apparatus for finding endpoints in speech by utilizing information contained in speech prosody. Prosody denotes the way speakers modulate the timing, pitch and loudness of phones, words, and phrases to convey certain aspects of meaning; informally, prosody includes what is perceived as the "rhythm" and "melody" of speech. Because speakers use prosody to convey units of speech to listeners (e.g., a change in pitch is used to indicate that a speaker has completed a sentence), the invention performs endpoint detection by extracting and interpreting the relevant prosodic properties of speech.

In one embodiment of the invention, referred to as "pre-recognition endpointing", prosodic properties are extracted prior to word recognition, and are used to infer when a speaker has completed a spoken command or utterance. The use of prosodic cues leads to a faster and more reliable determination that the intended end of an utterance has been reached. This prevents incomplete or overly long stretches of speech from being sent to subsequent speech processing stages. Furthermore, because the prosodic information used to make the endpointing determination only includes speech uttered up to the potential endpoint, endpointing can be performed in real-time while the user is speaking. The endpointing method extracts a series of prosodic parameters relating to the pitch and pause durations within the speech signal. The parameters are analyzed to generate an endpoint signal that represents the occurrence of an endpoint within the speech signal. The endpoint signal may be a posterior probability that represents the likelihood that an endpoint has occurred at any given point in the speech signal or a binary signal indicating that an endpoint has occurred.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention is embodied in software that is executed on a computer to perform endpoint identification within a speech signal. The executed software forms a method and apparatus that identifies endpoints in real-time as a speech signal is "streamed" into the system. An endpoint signal that is produced by the invention may be used by other applications such as a speech recognition program to facilitate accurate signal segmentation and word recognition.

Figure 1:
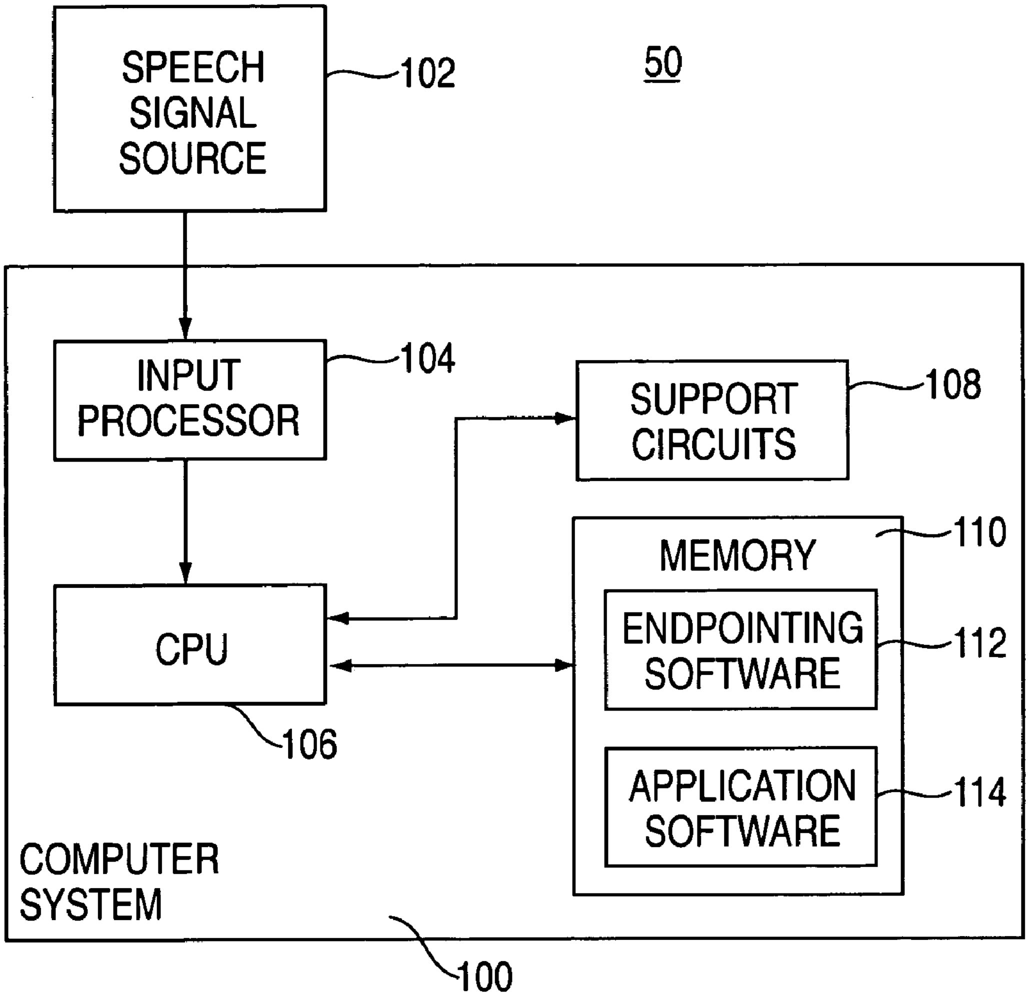
FIG. 1 is a block diagram of the prosody-based pre-recognition endpointing system.

FIG. 1 depicts a speech processing system 50 comprising a speech source 102 and a computer system 100. The computer system 100 comprises an input processor 104, a central processing unit (CPU) 106, support circuits 108, and memory 110. The speech source 102 may be a microphone, some other form of transducer, or a source of recorded speech. The input processor 104 may be a digital-to-analog converter, filter, signal separator, noise canceller and the like. The CPU 106 may be any one of a number of microprocessors that are known in the art. The CPU 106 may also be a specific processing computer such as an application specific integrated circuit (ASIC). The support circuits 108 may comprise well known circuits that support the operation of the CPU 106 such as clocks, power supplies, cache, input/output (I/O) circuits and the like. The memory 110 may comprise read-only memory, random access memory, removable storage, disk drives or any combination of these or other memory devices. The memory 110 stores endpointing software 112 as well as application software 114 that uses the output of the endpointing software 112. One embodiment the invention is implemented by execution of the endpointing software 112 using the CPU 106. Other embodiments of the invention may be implemented in software, hardware, or a combination of software and hardware.

Figure 2:
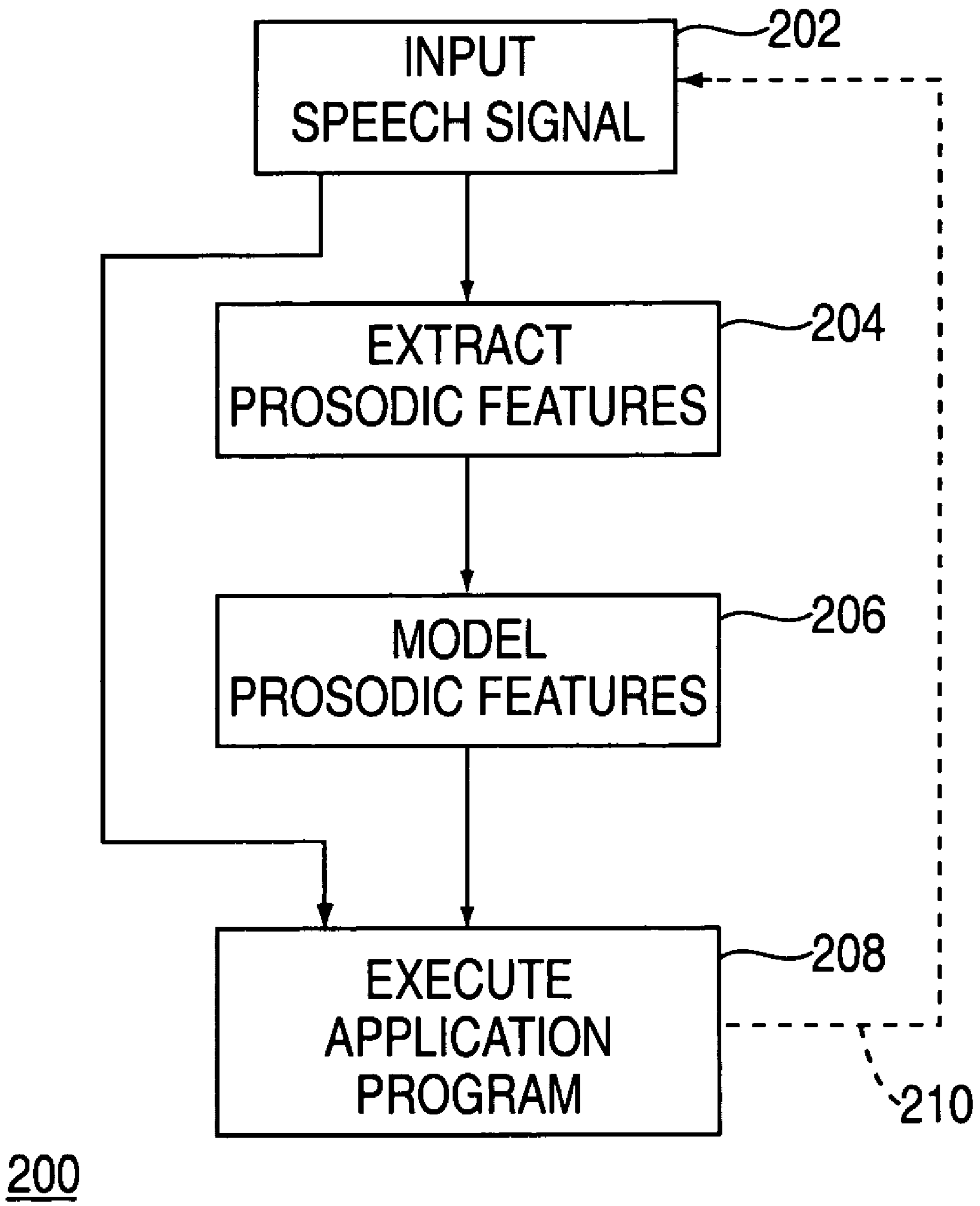
FIG. 2 is a flow diagram of prosody-based pre-recognition endpointing method.

FIG. 2 depicts a flow diagram of a method 200 that is performed by the system when the CPU 106 executes the endpointing software 112. The method 200 begins at step 202 with the input of a speech signal to the system 50. At step 204, the method 200 extracts the prosodic features contained within the speech signal. At step 206, the method 200 models the prosodic features to produce an endpoint signal.

The endpoint signal may be a binary signal that identifies the occurrence of an endpoint or the endpoint signal may be a continuously generated signal that indicates a probability that an endpoint has occurred at any moment in time. At step 208, the endpoint signal and the speech signal are coupled to an application program such as a speech recognition program, a speech-to-text translation program and the like. These programs use the endpoint signal to facilitate speech signal segmentation and word recognition.

The dashed line 210 represents the iterative nature of the endpointing process. Each sample of the speech signal is processed to generate the endpoint signal, then the next sample is processed. The new sample will be used to update the endpoint signal. As such, a continuous flow of endpointing information is generated as the speech signal is processed. Thus, endpoint information can be supplied in real-time or near-real-time depending on the computing speed that is available.

Figure 3:
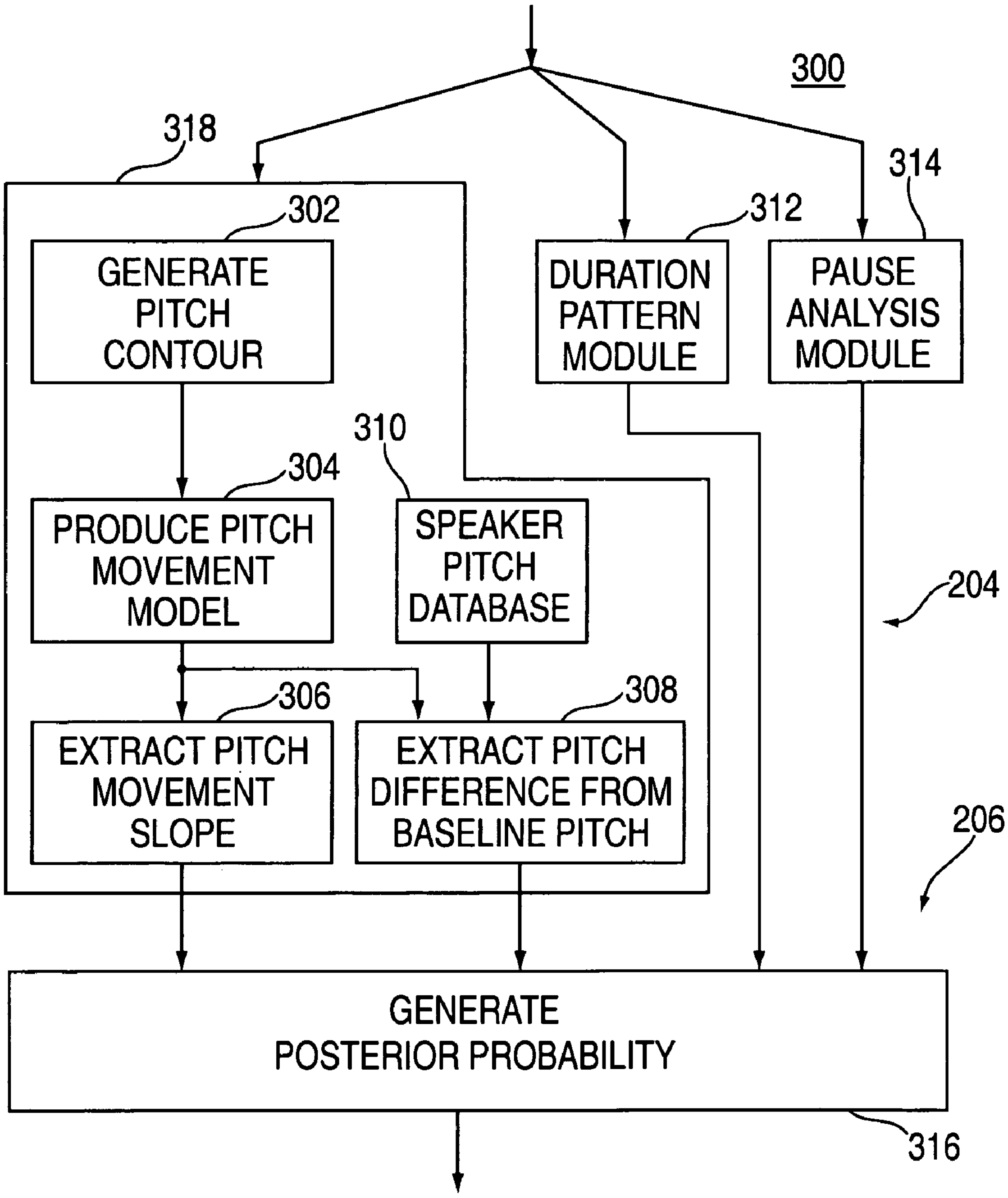
FIG. 3 is processing architecture for a method of extracting and analyzing prosodic features from a speech signal.

FIG. 3 depicts a processing architecture 300 that performs prosodic feature extraction and modeling in accordance with the present invention. The architecture 300 comprises a pause analysis module 314, a duration pattern module 312 and a pitch processing module 318. Each of these modules represents executable software for performing a particular function.

The pause analysis module 314 performs a conventional "speech/no-speech" algorithm that detects when a pause in the speech occurs. The output is a binary value that indicates whether the present speech signal sample is a portion of speech or not a portion of speech. This module 314 is considered optional for use in the inventive method to facilitate generation of additional information that can be used to identify an endpoint.

The duration pattern module 312 analyzes whether phones are lengthened with respect to average phone durations for the speaker. The lengthening of phones is indicative of the speaker not being finished speaking. The output of module 312 may be a binary signal (e.g., the phone is longer than average, thus output a one; otherwise output a zero) or a probability that indicates the likelihood that the speaker has completed speaking in view of the phone length.

The pitch processing module 318 is used to extract certain pitch parameters from the speech signal that are indicative of the speaker has completed an utterance. The module 318 extracts a fundamental pitch frequency (f o) from the speech signal and stylizes "pitch movements" of the speech signal (i.e., tracks the variations in pitch over time). Within the module 318, at step 302, a pitch contour is generated as a correlated sequence of pitch values. The speech signal is sampled at an appropriate rate, e.g., 8 kHz, 16 kHz and the like. The pitch parameters are extracted and computed (modeled) as discussed in K. Sonmez et al., "Modeling Dynamic Prosodic Variation for Speaker Verification", Proc. Intl. Conf. on Spoken Language Processing, Vol. 7, pp 3189–3192 (1998) which is incorporated herein by reference. The sequence can be modeled in a piecewise linear model or in a polynomial of a given degree as a spline. At step 304, a pitch movement model is produced from the pitch contour using a finite state automaton or a stochastic Markov model. The model estimates the sequence of pitch movements. At steps 306 and 308, the module 318 extracts pitch features from the model, where the pitch features signal whether the speaker intended to stop, pause, continue speaking or ask a question. The features include the pitch movement slope (step 306) and the pitch translation from a baseline pitch (step 308). Baseline processing is disclosed in E. Shriberg et al. "Prosody-Based Automatic Segmentation of Speech into Sentences and Topics", Speech Communication, Vol. 32, Nos. 1–2, pp 127–154 (2000).

More particularly, step 308 produces a unique speaker-normalization value that is estimated using a lognormal tied mixture approach to modeling speaker pitch. Such a model is disclosed by Sonmez et al in the paper cited above. The technique compares the present pitch estimate with a baseline pitch value that is recalled from a database 310. The database contains baseline pitch data for all expected speakers. If a speaker's pitch is near the baseline pitch, they have likely completed the utterance. If, on the other hand, the pitch is above the baseline, the speaker is probably not finished with the utterance. As such, the comparison to the baseline enables the system to identify a possible endpoint, e.g., falling pitch prior to a pause. An utterance that ends in a question generally has a rising pitch movement slope, so that the baseline difference information can be combined with the pitch movement slope feature to identify an endpoint of a question.

The pitch contour generation step (step 302) may include the voicing process that produces a value that represents whether the sample is a portion of a voiced speech sound. In other words, the module identifies whether the sampled sound is speech or some other sound that can be disregarded by the endpointing process. The value is either a binary value or a probability (e.g., a value ranging from 0 to 100 that indicates a likelihood that the sound is speech). In one embodiment the voice process may couple information to the pitch processing module 318 to ensure that the pitch processing is only performed on voice signals. Pitch information is not valid for non-voice signals.

At step 316, the extracted prosodic features are combined in either a data-driven fashion (i.e., estimated from an endpoint-labeled set of utterances, to generate predictors relevant to endpointing or using an a priori rule set that is generated by linguistic reasoning. Combinations of both approaches may be used. The output is a endpoint signal that represents the occurrence of an endpoint in the speech signal. The endpoint signal may take the form of a binary signal that identifies when an endpoint has occurred or the endpoint signal may be a posterior probability that provides a likelihood that the speech signal at any point in time is an endpoint (e.g., a scale of 0 to 100, where 0 is no chance of the speech being at an endpoint and 100 identifying that the speech is certainly at an endpoint). The endpoint signal may contain multiple posterior probabilities such as a probability that the utterance is finished, the probability that a pause is due to hesitation, and the probability that the speaker is talking fluently. The posterior probability or probabilities are produced on a continuous basis and are updated with changes in the detected prosodic features.

The forgoing embodiment extracts the features of the speech signal "on-the-fly" in real-time or near real-time. However, the invention may also be used in a non-real-time word recognition system to enhance the word recognition process. For example, the features may be extracted at a frame level (e.g., with respect to a group of speech samples that are segmented from the continuous speech signal). Additional frame-level features can be extracted that represent duration related features based on the phone level transcription output. Such features include speaker-and utterance-normalized duration of vowels, syllables, and rhymes (the last part of a syllable, or nucleus plus coda). Such features can provide a continuously updated posterior probability of utterance endpoint to enhance the speech recognition accuracy, i.e., information regarding vowels, syllables, and so on is useful for the speech recognition system to identify particular words. Furthermore, the additional information that is extracted because of the availability of segments of speech to analyze can be used to enhance the endpointing posterior probability. In effect, an initial posterior probability that was generated in real-time (pre-recognition processing), could later be updated when a frame-level analysis is performed.

While foregoing is directed to the preferred embodiment of the present invention, other and further embodiments of the invention may be devised without departing from the basic scope thereof, and the scope thereof is determined by the claims that follow.

The invention claimed is:

1. A method for processing a speech signal comprising:

extracting prosodic features from a speech signal;

modeling the prosodic features to identify at least one speech endpoint;

producing an endpoint signal corresponding to the occurrence of the at least one speech endpoint; and providing the endpoint signal and the speech signal to a speech recognition application to facilitate subsequent recognition of the speech signal.

2. The method of claim 1 wherein the extracting step comprises:

processing pitch information within the speech signal.

3. The method of claim 2 wherein the extracting step further comprises:

determining a duration pattern; and performing pause analysis.

4. The method of claim 2 wherein the processing step comprises:

generating a pitch contour;

producing a pitch movement model from the pitch contour; and extracting at least one pitch parameter from the pitch movement model.

5. The method of claim 4 wherein the at least one pitch parameter is a pitch movement slope.

6. The method of claim 4 wherein the at least one pitch parameter is a difference between the pitch information in the speech signal and baseline pitch information.

7. The method of claim 1 wherein the producing step comprises generating a posterior probability regarding the at least one speech endpoint.

8. The method of claim 7 wherein the posterior probability regarding a plurality of speaker states including a probability that a speaker has completed an utterance, a probability that the speaker is pausing due to hesitation, or a probability that the speaker is talking fluently.

9. The method of claim 8 where the posterior probability is continuously updated as the speech signal is processed.

10. The method of claim 1 further comprising:

executing a speech recognition routine for processing the speech signal using the at least one speech endpoint.

11. Apparatus for processing a speech signal comprising:

a prosodic feature extractor for extracting prosodic features from the speech signal;

a prosodic feature analyzer for modeling the prosodic features to identify at least one speech endpoint;

an endpoint signal producer that produces an endpoint signal corresponding to the occurrence of the at least one speech endpoint; and means for providing the endpoint signal and the speech signal to a speech recognition application to facilitate subsequent recognition of the speech signal.

12. The apparatus of claim 11 wherein the prosodic feature extractor comprises:

a pitch processor for processing pitch information within the speech signal.

13. The apparatus of claim 12 wherein the prosodic feature extractor further comprises:

means for determining a duration pattern; and means for performing pause analysis.

14. The apparatus of claim 12 wherein the pitch processor comprises:

means for generating a pitch contour;

means for producing a pitch movement model from the pitch contour; and means for extracting at least one pitch parameter from the pitch movement model.

15. The apparatus of claim 14 wherein the at least one pitch parameter is a pitch movement slope.

16. The apparatus of claim 14 wherein the at least one pitch parameter is a difference between the pitch information in the speech signal and baseline pitch information.

17. The apparatus of claim 11 wherein the endpoint signal producer comprises a posterior probability generator for generating a posterior probability regarding the at least one speech endpoint.

18. The apparatus of claim 17 wherein the posterior probability regarding a plurality of speaker states includes a probability that a speaker has completed an utterance, a probability that the speaker is pausing due to hesitation, or a probability that the speaker is talking fluently.

19. The apparatus of claim 18 where the posterior probability is continuously updated as the speech signal is processed.

20. The apparatus of claim 11 further comprising:

a computer for executing a speech recognition routine for processing the speech signal using the at least one speech endpoint.

21. An electronic storage medium for storing a program that, when executed by a processor, causes a system to perform a method for processing a speech signal comprising:

extracting prosodic features from a speech signal;

modeling the prosodic features to identify at least one speech endpoint;

producing an endpoint signal corresponding to the occurrence of the at least one speech endpoint; and providing the endpoint signal and the speech signal to a speech recognition application to facilitate subsequent recognition of the speech signal.

22. A method for processing a speech signal comprising:

extracting prosodic features from a speech signal by processing pitch Information within the speech signal;

modeling the prosodic features to identify at least one speech endpoint;

producing an endpoint signal corresponding to the occurrence of the at least one speech endpoint; and providing the endpoint signal and the speech signal to a speech processing application to facilitate subsequent processing of the speech signal.

23. Apparatus for processing a speech signal comprising:

a prosodic feature extractor for extracting prosodic features from the speech signal by processing pitch information within the speech signal;

a prosodic feature analyzer for modeling the prosodic features to identify at least one speech endpoint;

an endpoint signal producer that produces an endpoint signal corresponding to the occurrence of the at least one speech endpoint; and means for providing the endpoint signal and the speech signal to a speech processing application to facilitate subsequent processing of the speech signal.

24. An electronic storage medium for storing a program that, when executed by a processor, causes a system to perform a method for processing a speech signal comprising:

extracting prosodic features from a speech signal by processing pitch information within the speech signal;

modeling the prosodic features to identify at least one speech endpoint;

producing an endpoint signal corresponding to the occurrence of the at least one speech endpoint; and providing the endpoint signal and the speech signal to a speech processing application to facilitate subsequent processing of the speech signal.

* * * * *